United States Patent [19]

Hendrixon

[11] Patent Number: 4,617,968
[45] Date of Patent: Oct. 21, 1986

[54] ELECTROHYDRAULIC CONTROL OF A SPOOL VALVE FOR ENERGIZING A HEAVY DUTY AUTOMATIC TRANSMISSION CLUTCH

[75] Inventor: John Hendrixon, Shelby, Mich.

[73] Assignee: Sealed Power Corporation, Muskegon, Mich.

[21] Appl. No.: 719,898

[22] Filed: Apr. 4, 1985

[51] Int. Cl.$^4$ ............................................. F15B 13/043
[52] U.S. Cl. .................................. 137/625.64; 74/868; 91/433
[58] Field of Search .................... 74/868, 869; 91/433; 137/625.64

[56] References Cited

FOREIGN PATENT DOCUMENTS 2102158  1/1983  United Kingdom ........... 137/625.64

Primary Examiner—Gerald A. Michalsky
Attorney, Agent, or Firm—Barnes, Kisselle, Raisch, Choate, Whittemore & Hulbert

[57] ABSTRACT

An electrohydraulic control system comprising a spool valve including a body having a bore. A spool is positioned in the bore for reciprocating movement within the bore. The valve body has an inlet, an outlet and an exhaust port. An electrohydraulic three-way normally closed pulse width modulated valve has an inlet communicating with the inlet to the valve body and an outlet communicating with one end of the spool. An electrohydraulic three-way normally closed ON/OFF valve has an inlet communicating with the outlet of the body and an outlet communicating with the other end of the spool. A spring yieldingly urges the spool toward the pulse width modulated valve. The spool is positioned so that it normally obstructs a path from the inlet to the outlet.

6 Claims, 5 Drawing Figures

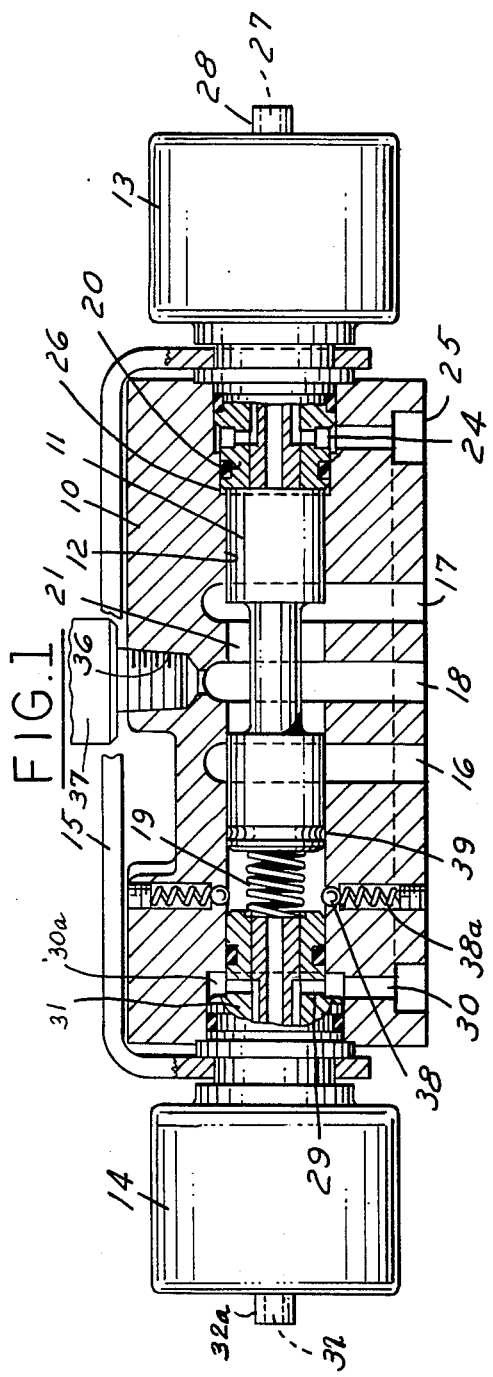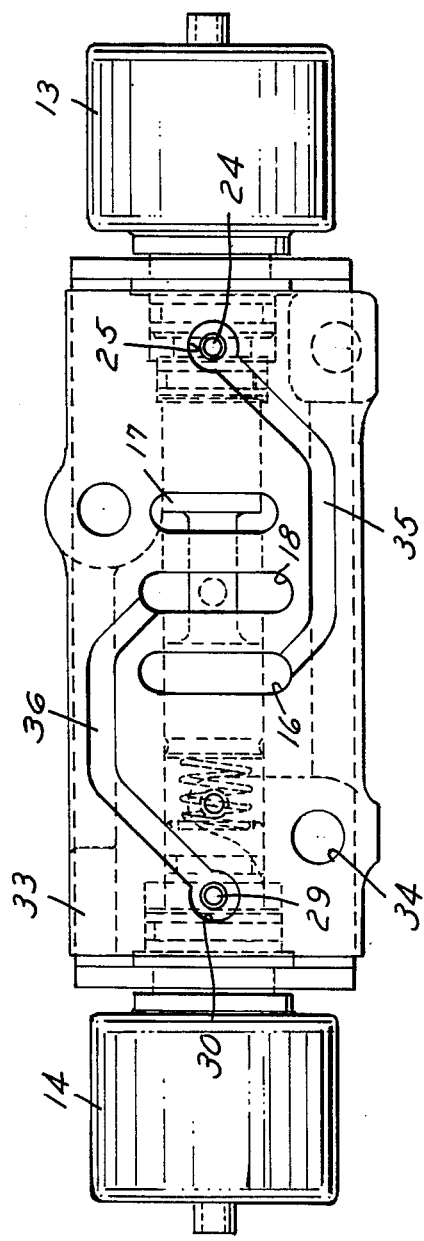

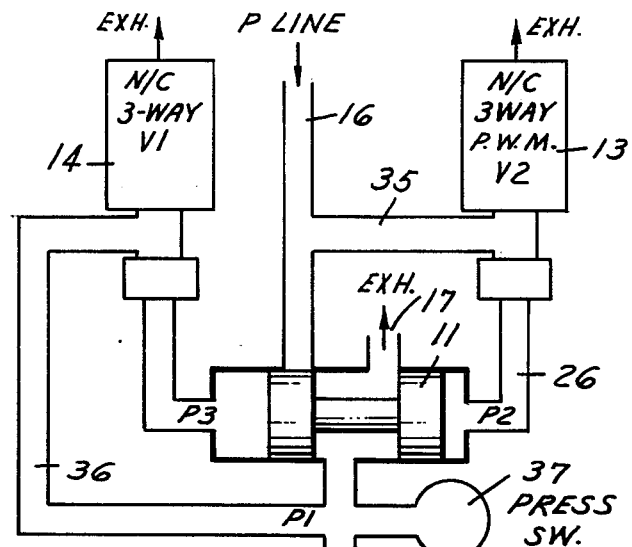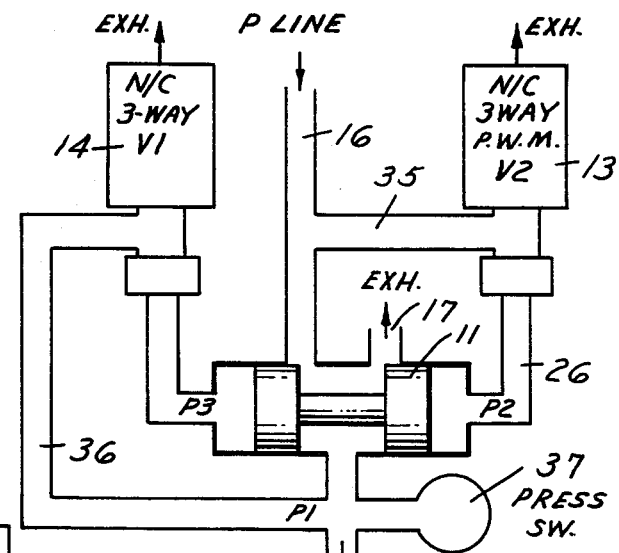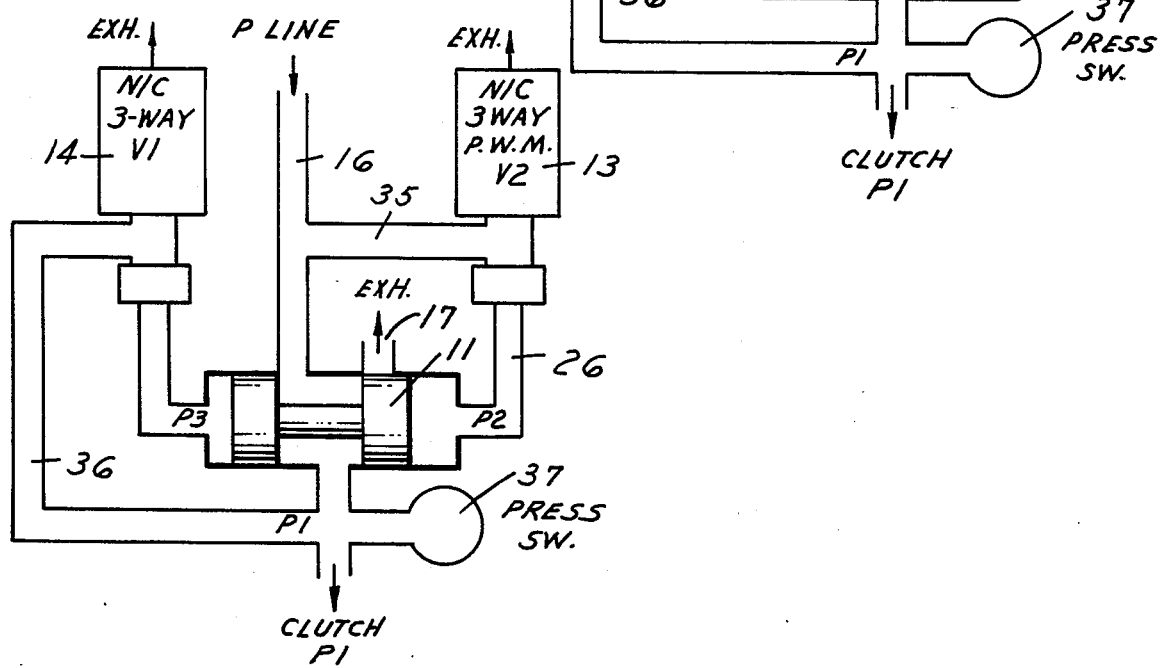

ELECTROHYDRAULIC CONTROL OF A SPOOL VALVE FOR ENERGIZING A HEAVY DUTY AUTOMATIC TRANSMISSION CLUTCH

This invention relates to electrohydraulic control systems and particularly to such systems for energiing and deenergiing heavy duty automatic transmission clutches.

BACKGROUND AND SUMMARY OF THE INVENTION

Control of the gear shift points for changing from one gear to another in heavy duty automatic transmissions of the type used in trucks, buses and off road equipment historically have been controlled by mechanical inputs such as centrifugal governors monitoring engine speed and driveshaft speed along with throttle position and, in some instances, output shaft torque.

The shift point from transmission to transmission for any given set of conditions varies significantly due to the inherent manufacturing tolerances and the calibration of the various mechanical linkage components. The mechanical inputs activate pilot spool valves which, in turn, control main spool valves to energize and de-energize the various clutches as the transmission shifts from one gear to the next. Since the spool valves are activated mainly in an ON/OFF mode with little or no pressure regulation between the extremes, the shifts tend to be quite abrupt causing torque spikes in the transmission output and high pressure clutch slippage resulting in clutch face wear.

By electronically monitoring engine speed, output speed and torque, and throttle position, it is possible with an inexpensive microcomputer to calculate the exact shift point required for any set of conditions and to control an electrohydraulic device to energize and/or de-energize the appropriate clutches when shifting from one gear to another. The clutch for the desired gear is engaged as the clutch for the undesirable gear is being de-energized. In energizing a clutch of this type, it is necessary to first fill the clutch hydraulic cavity with hydraulic fluid at a low pressure, such as 10-20 PSI, which compresses the clutch return springs and brings the clutch faces into low pressure sliding engagement. The hydraulic volume necessary to fill the clutch can be up to 10 cubic inches and is variable within any given clutch depending on the amount of residual oil in the clutch at the beginning of fill and the amount of wear on the clutch faces and components. It is desirable to fill the clutch volume rapidly, for example, in 0.5 seconds or less, therefore, an initial high flow rate is required, for example, 10-20 gallons per minute.

Once the clutch is full, the pressure in the clutch cavity must be linearly increased from the low 10-20 PSI fill pressure to line pressure to bring the clutch faces into non-slipping high pressure engagement. Line pressure is normally high, on order of 150 PSI, but may vary from 60 PSI to 350 PSI.

After the clutch is fully applied, it is necessary to "latch" or hold the clutch in this position without an electrical signal to the electrohydraulic valve. This "latching" of the clutch is a safety measure to insure that the transmission will remain in gear in the event of electrical power loss.

To de-clutch, it is necessary to linearly reduce the pressure within the clutch from line pressure to zero.

The present invention is directed to an electrohydraulic control device to energize and de-energize clutches through electrical commands from a microcomputer.

Among the objectives of the invention are to provide an electrohydraulic control system which comprises a spool valve including a body having a bore. A spool is positioned in the bore for reciprocating movement within the bore. The valve body has an inlet, an outlet and an exhaust port. An electrohydraulic three-way normally closed pulse width modulated valve has an inlet communicating with the inlet to the valve body and an outlet communicating with one end of the spool. An electrohydraulic three-way normally closed ON/OFF valve has an inlet communicating with the outlet of the body and an outlet communicating with the other end of the spool. A spring yieldingly urges the spool toward the pulse width modulated valve. The spool is positioned so that it normally obstructs a path from the inlet to the outlet.

DESCRIPTION OF THE DRAWINGS

FIG. 1 is a longitudinal sectional view of an electrohydraulic valve system embodying the invention.

FIG. 2 is a plan view of a monitoring surface of the valve system.

FIGS. 3, 4 and 5 are schematic hydraulic circuits of the hydraulic control system showing the relative positions of the parts in different operative situations.

DESCRIPTION

Referring to FIG. 1, the device consists generally of the body 10 with spool 11 located in bore 12 and a normally closed three-way pulse width modulated (PWM) valve 13 and a normally closed three-way ON/OFF valve 14 closing the ends of the bore 12. A band 15 functions to hold valves 13 and 14 in position in the bore 12. The spool 11 functions to selectively open or close inlet port 16 and main exhaust port 17 through the relative axial movement of spool 11 within bore 12. Within the range of spool movement, a clutch feed port 18 remains full open. FIG. 1 shows the device in its fully de-energized state with a spring 19 holding spool 11 fully to the right against the outlet end 20 of valve 13. In this position, inlet port 16 is fully covered and any residual pressure in the clutch will be relieved through spool cavity 21 from port 18 to exhaust port 17 to the sump. O-rings provide a seal between each of the valves 13, 14 and the body 10. The PWM valve 13 is configured so that line pressure fluid enters through a radial opening 24 from conduit 25 and is modulated to produce a fluid pressure output directly proportional to the electrical signal through outlet end 20 into a cavity 26 formed at the end of valve 13 and the bore 12. Exhaust fluid from the PWM valve 13 exits to the sump through an axial bore 27 in a protrusion 28. In this configuration, when the PWM valve 13 is fully de-energized, the inlet is held closed and any fluid in cavity 26 is forced out through exhaust port 27 as the spring 19 urges the spool 11 to the extreme right position against end 20.

The ON/OFF valve 14 is configured so that fluid pressure applied to the clutch through port 18 also enters the inlet port 29 through conduit 30. When the ON/OFF valve 14 is de-energized, the inlet port 29 is held closed so that no fluid can flow into valve 14 from the clutch port 18 and any fluid in the valve 14 or in the cavity 30a formed by the end 31, the bore 12 and the spool 11 is vented to sump through an axial exhaust port 32 through protrusion 32a. When the valve is energized, the exhaust port 32 is held closed and the inlet port 29 is opened so that any fluid pressure applied to the clutch enters through inlet 29 to cavity 30a.

Referring to FIG. 2, the device is mounted to the transmission with surface 33 in sealing engagement on a like surface in the transmission with ports corresponding to ports 16, 17 and 18 in block 10 and with corresponding threaded holes aligning with mounting holes 34 for receiving mounting bolts. Channels 35 and 36 are cast in block 10 and form conduits for linking inlet port 16 with conduit 25 and clutch port 18 with conduit 30 when block 10 is secured in sealing engagement with the transmission.

The operating sequence of the device is as follows: To fill the clutch, PWM valve 13 is activated to a predetermined duty cycle in the range of 30% to 100% which produces a fluid output into cavity 26 at a pressure that is a percentage of line pressure directly proportional to duty cycle. The pressure in cavity 26 causes a force to act to the left on spool 11 overcoming the force of spring 19 causing spool 11 to move to the left exposing inlet port 16 and allowing it to communicate with clutch port 18 and closing off exhaust port 17. In this position, fluid is flowing in through port 16 into cavity 21 out through port 18 to the clutch at a pressure of 15-40 PSI depending on the back pressure caused by compressing the springs in the clutch and the rate of fill of the clutch cavity. When the clutch is filled, the pressure will very rapidly rise toward line pressure as flow is dead headed into the full clutch. At this point, a pressure transducer 37 installed in tapped hole 37 will sense the rise in pressure and simultaneously energize ON/OFF valve 14 causing fluid at clutch port pressure to fill cavity 30 and exert a balancing force on the end of spool 11 and reduce the duty cycle input to valve 13 and 15%-30%.

Alternatively, instead of using a pressure transducer 27 to sense the clutch full condition, the fill cycle can run on a time cycle so that after a predetermined period of time, ON/OFF valve 14 is switched ON and the PWM duty cycle to valve 13 is reduced to 15%-30%. This method does not take into account variations in clutch volume and can tend to give poor quality shifts compared to the transducer monitored fill cycle.

The force on spool 11 from the fluid pressure in cavity 30 plus the force due to spring 19 will overcome the force due to the fluid in cavity 26 and cause the spool to move to the right restricting the inlet port 16 and consequently the flow through port 18 to the clutch. The spool 11 will assume a position where fluid will be metered at the intersection of spool 11 and port 16 such that output pressure to the clutch and thus fluid pressure force in cavity 20 will equal the PWM valve 13 input pressure into cavity 26 less the pressure necessary to equal the force due to spring 10. The spool 11 will remain in this equilibrium position maintaining the clutch pressure as long as the PWM output remains constant. To increase pressure in the clutch, the duty cycle to the PWM valve 13 is increased increasing the pressure in cavity 26 causing a force imbalance on spool 11 moving it to the left allowing the clutch pressure to increase until the pressure force in cavity 30 again causes the spool 11 to balance with the clutch pressure again equal to PWM pressure less the spring force.

Once the clutch is filled and equilibrium is attained which takes about 0.1-0.3 seconds, the clutch is engaged smoothly by linearly increasing the duty cycle of the PWM valve, in a preset time span of 0.5 to 1.5 seconds, from the preset value of 15%-30% to 100% which due to the balancing effect of the clutch feedback pressure into cavity 30 linearly increases the clutch pressure up to line pressure less the spring force equivalent pressure which is approximately 10 PSI. At this point, the ON/OFF valve 14 is de-energized which reduces the pressure in cavity 30 to zero while the pressure cavity 26 is still at line pressure, the force imbalance which is nearly 30# at 150 PSI line pressure moves the spool 11 to the left end stop which is the end 20, fully opening port 16 to communicate with port 22 via cavity 21 supplying full line pressure to the clutch.

Detents are provided through the action of springs 38a urging balls 38 into bore 12. The spool 11 is provided with a detent groove 39 around its circumference so that when the spool 11 is in the extremem left position, the detent balls 38 engage detent groove 39 and hold the spool 11 securely enough to withstand the force of spring 19 urging it to the right.

With the spool 38 thus detented, the PWM valve 13 can be turned off so that the pressure in cavity 26 is vented to sump through exhaust port 25 and the output to the clutch remains at line pressure.

The electrohydraulic valves 13 and 14 may be of any conventional construction as shown in U.S. patent application Ser. No. 577,853 filed Feb. 7, 1984, now abandoned, having a common assignee with the present application, which is incorporated herein by reference.

FIGS. 3, 4 and 5 are schematic hydraulic circuits of the control system. In typical examples of operation, the relationships are as follows, valve 14 being referred to as $V_1$ and valve 13 being referred to as $V_2$:

De-Energized No Pressure Applied (FIG. 3)

Valve $V_1$=Off
Valve $V_2$=Off
$P_1=0$
$P_2=0$
$P_3=0$

Regulating Mode (FIG. 4)

Fill:
Valve $V_2$=10% duty cycle
$P_2=15$ psi
Valve $V_1$=Unenergized
$P_3=0$
When the clutch fills, a spike of pressure will close 15 psi switch initiating ramp up and energizing valve $V_1$ to balance spool as $P_1=P_3$; then $V_2$ duty cycle can be increased as desired to achieve ramp up. Spool will balance to match $P_1$ to $P_2$ until $P_2=P$ line.

De-Energized Full Pressure Applied (FIG. 5)

At signal for 100% duty cycle, $V_1$ deenergizes just before $V_2$ to detent spool. After $V_2$ is de-energized, the spool is held in position by detents.
$P_1$ no longer $=P_3$
$P_2$ and $P_3$ go to exhaust$=0$
$P_1=P$ line To De-Clutch Energize valve $V_2$ at 100% momentarily before energizing valve $V_1$. Ramp down reversing regulating mode.
At 0% duty cycle, de-energize valve $V_1$ and valve $V_2$ simultaneously.

It can thus be seen that there has been provided an electrohydraulic system which can be operated to fill a device such as a clutch cavity with hydraulic fluid at a low pressure, thereafter increase the pressure to line pressure to bring the clutch faces into non-slipping high pressure engagement and to hold the clutch in this position, followed by de-clutching by reducing the pressure within the clutch from line pressure to zero.

I claim:

1. An electrohydraulic control system comprising
a spool valve including a body having a bore,
a spool positioned in the bore for reciprocating movement within the bore,
said valve body having an inlet, an outlet and an exhaust port intersecting said bore,
said spool being operable to selectively control the flow of fluid from said inlet to said exhaust, and said outlet,
an electrohydraulic three-way normally closed pulse width modulated valve having an inlet communicating with the inlet to said valve body and an outlet communicating with one end of said spool,
an electrohydraulic three-way normally closed ON/OFF valve having an inlet communicating with the outlet of said body and an outlet communicating with the other end of said spool.

2. The electrohydraulic valve system set forth in claim 1 including spring means yieldingly urging said spool toward said pulse width modulated valve,
said spool being positioned so that it normally obstructs a path from the inlet to the outlet.

3. The electrohydraulic control system set forth in claim 2 including detent means operable upon shifting of the spool toward the ON/OFF valve for holding said spool in position after it has been shifted,
said spool in its normal position under the action of the spring means, with the two valves de-energized, being operable to prevent flow from the inlet and permitting the exhaust port to open and operable upon shifting of the valve toward the ON/OFF valve to partially open the inlet and permit flow through the outlet in accordance with the energization of the ON/OFF valve functioning to provide a hydraulic feedback signal that balances the output of the pulse width modulated valve to regulate the flow through the spool so that the pressure supplied through the outlet is substantially the same as the pressure of the pulse width modulated valve less the pressure of the spring means.

4. The electrohydraulic valve control system set forth in claim 1 wherein said spool valve comprises spaced lands, one land being operable to provide metering control of the inlet and the other being operable to the control exhaust port,
said outlet being positioned intermediate said lands.

5. The electrohydraulic valve control system set forth in any of claims 1-4 wherein said body of said spool valve is provided with a passage providing communication between the inlet of said pulse width modulated valve and the inlet to said valve body and a passage providing communication between the inlet of said ON/OFF valve and the outlet of said body.

6. The electrohydraulic valve control system set forth in any of claims 1-4 including a pressure transducer for monitoring the fluid pressure in the outlet of the spool valve for sensing the increase in pressure due to a filled condition of a device to which the fluid is being delivered by said outlet.

* * * * *